(12) United States Patent
Fujino

(10) Patent No.: US 6,215,525 B1
(45) Date of Patent: Apr. 10, 2001

(54) SCANNING LINE INTERPOLATION APPARATUS AND METHOD

(75) Inventor: Shigeru Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/140,682

(22) Filed: Aug. 26, 1998

(30) Foreign Application Priority Data

Aug. 26, 1997 (JP) .................................................. 9-229458

(51) Int. Cl.⁷ .............................. H04N 7/01; H04N 11/20
(52) U.S. Cl. ..................... 348/452; 348/441; 348/448; 348/449; 348/459; 382/299; 382/300
(58) Field of Search ................... 348/441, 448, 348/449, 452, 458; 382/299, 300

(56) References Cited

U.S. PATENT DOCUMENTS

| | | | | |
|---|---|---|---|---|
| 4,985,764 | * | 1/1991 | Sato | 358/105 |
| 5,347,599 | * | 9/1994 | Yamashita et al. | 348/448 |
| 5,703,968 | * | 12/1997 | Kuwahara et al. | 348/448 |
| 5,742,348 | * | 4/1998 | Kuwahara et al. | 348/441 |
| 5,825,429 | * | 10/1998 | Shirahata | 348/448 |
| 6,009,213 | * | 12/1999 | Miyake | 382/300 |
| 6,021,230 | * | 2/2000 | Cho et al. | 382/300 |

FOREIGN PATENT DOCUMENTS

| | | |
|---|---|---|
| 63-156494 | 6/1988 | (JP) . |
| 1-194693 | 8/1989 | (JP) . |
| 2-294191 | 12/1990 | (JP) . |
| 3-190473 | 8/1991 | (JP) . |
| 3-226084 | 10/1991 | (JP) . |
| 4-86089 | 3/1992 | (JP) . |
| 7-245744 | 9/1995 | (JP) . |
| 7-327148 | 12/1995 | (JP) . |

* cited by examiner

Primary Examiner—Reinhard Eisenzopf
Assistant Examiner—Brian P. Yenke
(74) Attorney, Agent, or Firm—Young & Thompson

(57) ABSTRACT

In a scanning line interpolation apparatus, a scanning line delay element obtains a signal B by delaying an image input signal D by one scanning line. A first pixel delay element obtains a signal A by delaying the signal B output from the scanning line delay element by one pixel. A second pixel delay element obtains a signal C by delaying an input signal D by one pixel. A level comparator compares correlation of the signals A, B, C, and D to detect signals of pixels having the strongest correlation from the four pixels corresponding to the signals A, B, C, and D. An interpolated data calculator performs average value processing on the basis of detection results of the comparator to generate interpolated data Z. The scanning line delay element and the first and second pixel delay elements generate the four pixel signals A, B, C, and D of two pixels on an upper scanning line n of the input signal D and two pixels on a lower scanning line n+1 adjacent to the upper scanning line n. The interpolated data calculator generates the interpolated data Z using the pixels having the strongest correlation.

10 Claims, 3 Drawing Sheets

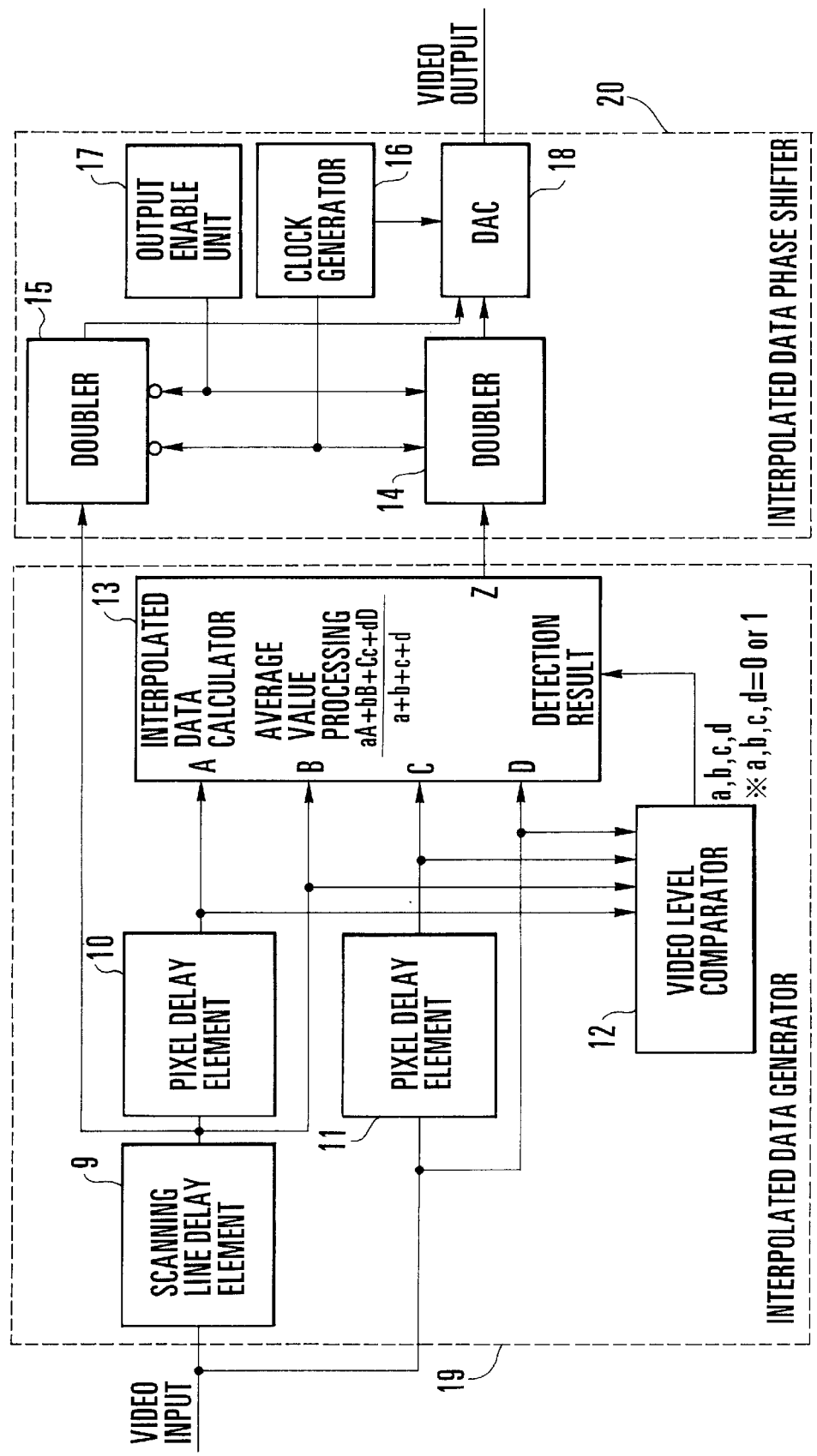
F I G. 1

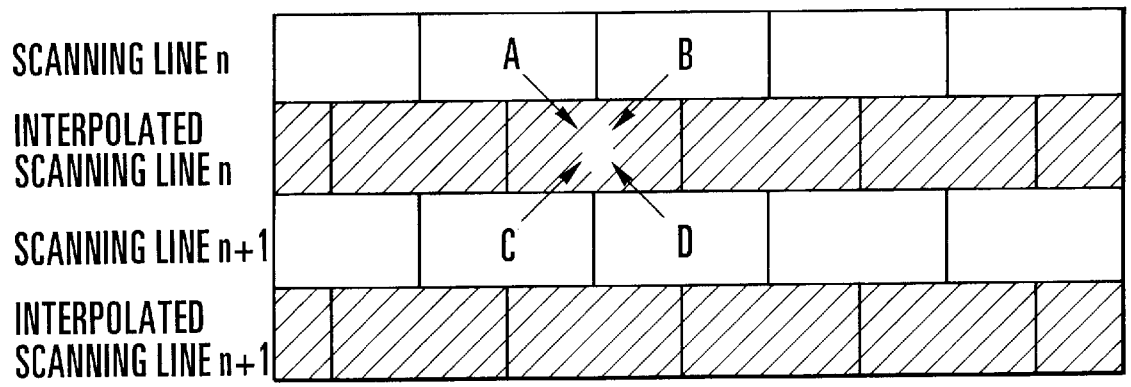
F I G. 2
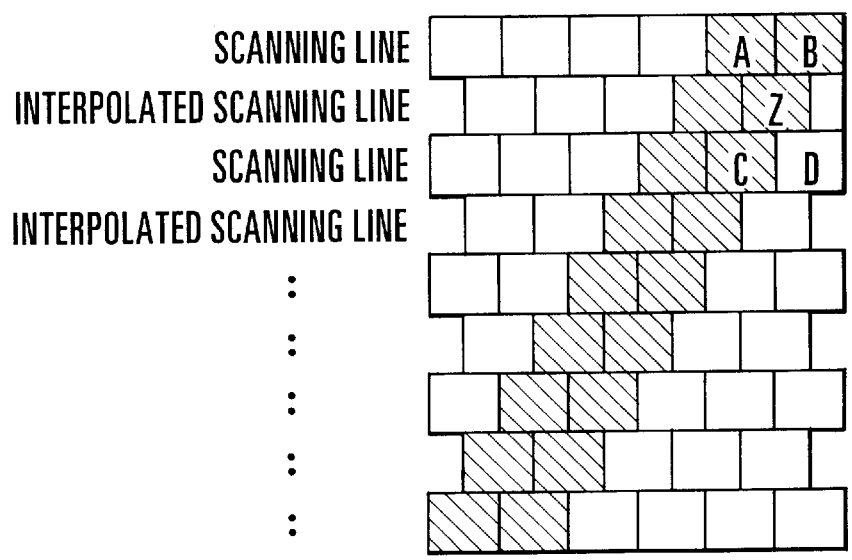
F I G. 3

SCANNING LINE INTERPOLATION APPARATUS AND METHOD

BACKGROUND OF THE INVENTION

The present invention relates to a scanning line interpolation apparatus and method for interpolating pixels or lines such as scanning lines of, e.g., a television image.

A conventional scanning line interpolation apparatus and method are generally applied to television devices. The scanning line interpolation schemes used in displaying images on television devices are mainly classified into three-dimensional processing and two-dimensional processing.

In general conventional three-dimensional processing, motion detection is performed using the pixel difference between adjacent frames in a motion adaptive scanning line interpolation scheme. The pixel data of the previous field is mixed with the pixel data obtained by averaging the pixel data on the upper and lower scanning lines of the current field in accordance with a degree of motion to obtain an interpolated signal, thereby properly performing scanning line interpolation for both still and moving images.

General conventional two-dimensional processing includes an average value scanning line interpolation scheme for performing interpolation using, as an interpolated scanning line, a value obtained by averaging upper and lower scanning lines in a field, and a simple overwrite scanning line interpolation scheme for simply scanning the same scanning line twice.

Japanese Patent Laid-Open No. 1-194693 entitled as a "motion adaptive scanning line interpolation method" is proposed as individual prior art 1. According to prior art 1, a one-frame difference is compared with a two-frame difference in motion coefficient detection by a motion coefficient generator having characteristics in which a motion coefficient decreases with an increase in level of a signal difference detected by an interframe difference. A smaller motion coefficient is employed. This implies that a larger motion is employed.

The motion coefficients obtained as described above are compared for three adjacent fields to employ a minimum value. The maximum motion is detected in the motion detection range using the one- and two-frame differences of the three adjacent fields. Scanning line interpolation of the current field is performed using this maximum motion. To employ the maximum motion is to employ a large weight in the bilinear data of the current field.

With the above arrangement, the bilinear data is employed as interpolated data in a higher degree as compared with a degree of motion. A slight decrease in resolution occurs accordingly, but an after image effect by inappropriate interpolation of previous field data can be prevented in advance. Therefore, the total image quality can be improved.

Japanese Patent Laid-Open No. 7-327148 entitled as a "line interpolation method and apparatus" is proposed as individual prior art 2. According to prior art 2, six pixels around a pixel of interest are calculated to express them in at least one of the luminance, hue, and saturation components. A pixel pair correlated with each other is selected from three pixel pairs, i.e., the pair of upper and lower pixels, the pair of upper right pixel and lower left pixel, and the pair of upper left pixel and lower right pixel with respect to the pixel of interest. The signal value of the selected pixel pair is changed to the signal value of the pixel of interest for each component. If no correlation is established in any one of the pixel pairs, the average value of the upper and lower pixels is defined as the signal value of the pixel of interest.

With the above arrangement, line interpolation having a higher correlation with the upper and lower lines can be performed. At the same time, interpolation having an importance in correlation for a color image can also be performed. Therefore, an image having a higher image quality can be obtained.

The motion adaptive scanning line interpolation scheme must detect the motion, the circuit scale increases due the presence of a motion detection circuit and an adaptive scanning line interpolation circuit, and the capacity of a memory also increases. The vertical resolution in the average value scanning line interpolation scheme becomes lower than that in interlaced scanning. In the simple overwrite scanning line interpolation scheme, obliquely rendered components become stepped as compared with an original image.

Prior arts 1 and 2 are associated with the motion adaptive scanning line interpolation scheme and the average value scanning line interpolation scheme, respectively. Prior arts 1 and 2 improve the problems and drawbacks of the corresponding schemes.

SUMMARY OF THE INVENTION

It is an object of the present invention to provide a scanning line interpolation apparatus and method in which rendering and pixel quality are improved with a simple arrangement.

In order to achieve the above object, according to the present invention, there is provided a scanning line interpolation apparatus comprising scanning line delay means for obtaining a signal B by delaying an image input signal D by one scanning line, first pixel delay means for obtaining a signal A by delaying the signal B output from the scanning line delay means by one pixel, second pixel delay means for obtaining a signal C by delaying an input signal D by one pixel, level comparison means for comparing correlation of the signals A, B, C, and D to detect signals of pixels having the strongest correlation from the four pixels corresponding to the signals A, B, C, and D, and interpolated data calculation means for performing average value processing on the basis of detection results of the comparison means to generate interpolated data Z, wherein the scanning line delay means and the first and second pixel delay means generate the four pixel signals A, B, C, and D of two pixels on an upper scanning line n of the input signal D and two pixels on a lower scanning line n+1 adjacent to the upper scanning line n, and the interpolated data calculation means generates the interpolated data Z using the pixels having the strongest correlation.

BRIEF DESCRIPTION OF THE DRAWINGS

FIG. 1 is a block diagram of a scanning line interpolation apparatus according to an embodiment of the present invention;

FIG. 2 is a view for explaining scanning line interpolation operation by the scanning line interpolation apparatus shown in FIG. 1;

FIG. 3 is a view showing detailed scanning line interpolation for an oblique line image.

DESCRIPTION OF THE PREFERRED EMBODIMENTS

Figure 4:
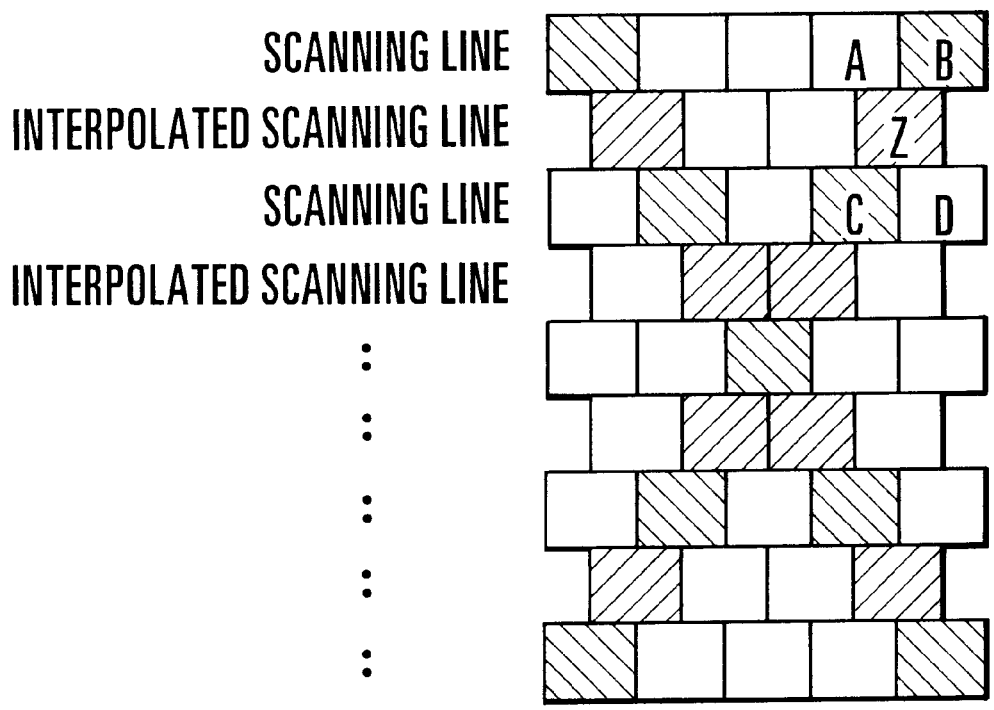
FIG. 4 is a view showing detailed scanning line interpolation for an X image.

The present invention will be described in detail with reference to the accompanying drawings.

FIG. 1 shows a scanning line interpolation apparatus according to an embodiment of the present invention. As shown in FIG. 2, assume that the scanning line interpolation apparatus of this embodiment calculates interpolated data Z on the basis of four pixels A, B, C, and D.

Referring to FIG. 1, the scanning line interpolation apparatus comprises an interpolated data generator 19 for always comparing the four pixels A, B, C, and D to calculate the interpolated data Z, and an interpolated data phase shifter 20 for offsetting the interpolated data in the horizontal direction and then outputting image data.

The interpolated data generator 19 comprises a scanning line delay element 9 connected to a video signal input terminal, a pixel delay element 10 connected to the scanning line delay element 9, a pixel delay element 11 connected to the video signal input terminal, a video level comparator 12 connected to the video signal input terminal, the scanning line delay element 9, and the pixel delay elements 10 and 11, and an interpolated data calculator 13 connected to the video signal input terminal, the scanning line delay element 9, and the pixel delay elements 10 and 11. The video level comparator 12 outputs a correlation detection result based on the signal comparison to the interpolated data calculator 13.

The interpolated data phase shifter 20 comprises a doubler 14 connected to the interpolated data calculator 13, a doubler 15 connected to the scanning line delay element 9, a clock generator 16, an output enable unit 17, and a digital-to-analog converter (DAC) 18 connected to the doublers 14 and 15. The clock generator 16 is connected to the doublers 14 and 15 and the DAC 18. The output enable unit 17 is connected to the doublers 14 and 15.

To compare adjacent pixel data on adjacent scanning lines, the scanning line delay element 9 and the pixel delay elements 10 and 11 in the interpolated data generator 19 generate the four pixel data A, B, C, and D of two pairs of adjacent pixels on upper and lower adjacent scanning lines n and n+1.

On the basis of these signals, the video level comparator 12 compares the signal levels of the pixel data A, B, C, and D to detect the correlation between the four signal levels. On the basis of this detection result, the interpolated data calculator 13 selects the pixels of the strongest correlation from the four pixel data A, B, C, and D and performs average value processing using the selected pixels to generate the interpolated data Z.

The interpolated data phase shifter 20 offsets the interpolated data Z in the horizontal direction with respect to the pixel phases on the upper and lower scanning lines by the doublers 14 and 15 for doubling the scanning lines, the clock generator 16, and the output enable unit 17. The offset data is output as a video output from the DAC 18. At this time, the outputs from the clock generator 16 and the output enable unit 17 are supplied to and doubled by the doublers 14 and 15.

The scanning line interpolation operation of the scanning line interpolation apparatus having the above arrangement will be described with reference to FIGS. 2 to 4.

As shown in FIG. 2, the four signals A, B, C, and D, i.e., the signal B delayed by one scanning line through the scanning line delay element 9, the signal A obtained by further delaying the signal B by one pixel by the pixel delay element 10, the input signal D, and the signal C obtained by delaying the signal D by one pixel by the pixel delay element 11 are extracted from the video signal input to the interpolated data generator 19. The signal level comparator 12 compares the signal correlation of these four signals A, B, C, and D, detects only the pixel signals of the strongest correlation from the four corresponding pixels, and outputs the signals to the interpolation data calculator 13.

The interpolated data calculator 13 calculates the average value of signals having the strongest correlation, which are selected from the four signals A, B, C, and D, on the basis of the detection result output from the video level comparator 12 and outputs the calculated value as an interpolated signal.

The interpolated data Z can be calculated by average value processing in the interpolated data generator 13 as follows:

$$Z=(aA+bB+cC+dD)/(a+b+c+d) \qquad (1)$$

where a, b, c, and d are comparison results from the video level comparator 12 and can be expressed by the logic value "0" or "1". The logic values "0" and "1" present the following.

When correlated with other pixels: "1"
When not correlated with other pixels: "0"
When not correlated with all pixels: "1"

The interpolated data Z output from the interpolated data calculator 13 is written in the doubler 14 in response to a clock output from the clock generator 16. The scanning line data (signal B) output from the scanning line delay element 9 is written in the doubler 15 in response to a 180° phase-shifted clock from the clock generator 16. The data written in the doublers 14 and 15 are alternately read out every scanning line and output as output signals from the DAC 18.

According to this embodiment, as shown in FIG. 2, the signal correlation values are obtained from the four pixels, i.e., the two points A and B on the scanning line n and the two points C and D on the scanning line n+1, and only the pixels having the correlation are selected to generate the interpolated data Z. The interpolated data can be generated by using a large number of data. This interpolated data Z is located at an equal distance from all the pixels on the scanning line n and is advantageous in a curved pixel array or oblique line rendering.

Detailed interpolation for an oblique line image and an X image will be described with reference to FIGS. 3 and 4. In rendering the oblique line shown in FIG. 3, three pixels A, B, and C out of the four pixels A, B, C, and D to be compared have the same signal level. A signal Z having the same signal level is interpolated at an equal distance from the pixels A, B, C, and D on the upper and lower scanning lines, thereby rendering a smooth oblique line. This also applies to other interpolated pixels.

Four pixels A, B, C, and D, i.e., upper, lower, left, and right pixels of the X image shown in FIG. 4 are compared to result in two white pixels and two black pixels. A gray color as the average value of the four pixels is interpolated as Z at an equal distance from the pixels A, B, C, and D on the upper and lower scanning lines. Therefore, a smooth letter "X" can be rendered to improve the image quality.

According to the detailed cases described above, the pixel phase of the interpolated scanning line is horizontally offset from the pixels on the adjacent upper and lower scanning lines, thereby improving rendering in the oblique directions. Even if interpolation processing is performed within a field, an interpolated pixel is generated from a total of four pixels, i.e., two consecutive pixels on the scanning line n and two consecutive pixels on the scanning line n+1 adjacent to the scanning line n. The pixel can be improved, and the circuit can be simplified as compared with the motion adaptive scanning line interpolation scheme.

According to the pixel layout of the input scanning lines and the interpolated scanning line, the pixel of the interpolated scanning line is located at a position horizontally offset by half the pixel from the pixels on the input scanning lines. Therefore, the pixel array is excellent in rendering a curve or oblique line.

The signal level correlation is calculated for the four adjacent pixels, i.e., the upper, lower, left, and right pixels, and only the pixels having the strongest correlation are used to obtain an average value, thereby obtaining the interpolated data. The interpolated data more accurate with respect to the input signals can be generated, and the circuit arrangement can be simplified because detection is not based on motion detection and the interpolated data is prepared using the four adjacent pixels, i.e., the upper, lower, left, and right pixels.

The present invention is not limited to the above embodiment. Various changes and modifications may be made without departing from the spirit and scope of the invention.

A signal B is obtained by delaying an input signal D by one scanning line, and a signal A is obtained by delaying the signal B by one pixel. A signal C is obtained by delaying the input signal D by one pixel. The correction values of the signals A, B, C, and D are compared with each other, and signals having the strongest correlation are selected from the signals of the four pixels and averaged to generate interpolated data Z. In this manner, the two pixel data A and B of the two adjacent pixels on an upper scanning line n and two pixel data C and D of the two adjacent pixels on a lower scanning line n+1 adjacent to the scanning line n are prepared, and the interpolated data Z is generated using the pixels having the strongest correlation.

The interpolated data having the strong correlation with the adjacent pixels are generated, and scanning line interpolation can be performed to improve high rendering quality and high pixel quality.

The scanning lines are doubled, and this doubling is controlled. The interpolated data Z is horizontally offset with respect to the pixel phases on the upper and lower scanning lines to output a video signal. The signal level correlation values are obtained from the four pixels, i.e., the two pixels on the scanning line n and two pixels on the scanning line n+1 adjacent to the scanning line n, and only the pixels having the strongest correlation are selected to generate the interpolated data. The interpolated data can be located at an equal distance from the respective pixels.

What is claimed is:

1. A scanning line interpolation apparatus comprising:
    scanning line delay means for obtaining a signal B by delaying an image input signal D by one scanning line;
    first pixel delay means for obtaining a signal A by delaying the signal B output from said scanning line delay means by one pixel;
    second pixel delay means for obtaining a signal C by delaying an input signal D by one pixel;
    level comparison means for comparing correlation of the signals A, B, C, and D to detect signals of pixels having the strongest correlation from the four pixels corresponding to the signals A, B, C, and D;
    interpolated data calculation means for performing average value processing on the basis of detection results of said comparison means to generate interpolated data Z; and
    phase shift means for horizontally shifting the interpolated data Z output from said interpolated data calculation means with respect to pixel positions on the upper and lower scanning lines, and then outputting a video signal,
    wherein said scanning line delay means and said first and second pixel delay means generate the four pixel signals A, B, C, and D of two pixels on an upper scanning line n of the input signal D and two pixels on a lower scanning line n+1 adjacent to the upper scanning line n, and
    said interpolated data calculation means generates the interpolated data Z using the pixels having the strongest correlation.

2. An apparatus according to claim 1, wherein said phase shift means comprises:
    a pair of doubling means for doubling the interpolated data Z from said interpolated data calculation means and each scanning line data corresponding to the signal B from said scanning line delay means and alternately outputting the doubled scanning line data;
    doubling control means for controlling doubling operations of said pair of doubling means; and
    video signal conversion means for converting the scanning line data alternately output from said pair of doubling means to output the video signal.

3. An apparatus according to claim 2, wherein said doubling control means comprises:
    clock generation means for supplying 180° phase-shifted clocks to said pair of doubling means; and
    enable means for alternately outputting enable signals in correspondence with doubling operations of said pair of doubling means.

4. A scanning line interpolation apparatus comprising:
    scanning line delay means for obtaining a signal B by delaying an image input signal D by one scanning line;
    first pixel delay means for obtaining a signal A by delaying the signal B output from said scanning line delay means by one pixel;
    second pixel delay means for obtaining a signal C by delaying an input signal D by one pixel;
    level comparison means for comparing correlation of the signals A, B, C, and D to detect signals of pixels having the strongest correlation from the four pixels corresponding to the signals A, B, C, and D; and
    interpolated data calculation means for performing average value processing on the basis of detection results of said comparison means to generate interpolated data Z,
    wherein said scanning line delay means and said first and second pixel delay means generate the four pixel signals A, B, C, and D of two pixels on an upper scanning line n of the input signal D and two pixels on a lower scanning line n+1 adjacent to the upper scanning line n,
    said interpolated data calculation means generates the interpolated data Z using the pixels having the strongest correlation, and
    said interpolated data calculation means calculates the interpolated data by average value processing using $$Z=(aA+bB+cC+dD)/(a+b+c+d)$$

under conditions that when each of symbols a, b, c, and d representing comparison results of said level comparison means has correlation with other pixels, each symbol is set at "1"; when each symbol has no correlation with other pixels, each symbol is set at "0"; and when each symbol has no correlation with all pixels, each symbol is set at "1".

5. An apparatus according to claim 1, wherein the interpolated data Z from said interpolated data calculation means is located at an equal distance from four pixels.

6. A scanning line interpolation method comprising the steps of:

obtaining a signal B by delaying an image input signal D by one scanning line;

obtaining a signal A by delaying the signal B by one pixel;

obtaining a signal C by delaying an input signal D by one pixel;

comparing correlation of the signals A, B, C, and D to detect signals having the strongest correlation from four pixels corresponding to the signals A, B, C, and D;

generating interpolated data Z by performing average value processing using detection results having the strongest correlation, and outputting a video signal after horizontally shifting the interpolated data Z with respect to pixel positions on the upper and lower scanning lines, wherein the steps of obtaining the signals A, B, and C comprise the step of generating the four pixel signals A, B, C, and D of two pixels on an upper scanning line n of the input signal D and two pixels on a lower scanning line n+1 adjacent to the scanning line n, and the step of generating the interpolated data Z comprises the step of generating the interpolated data Z using pixels having the strongest correlation.

7. A method according to claim 6, wherein the step of outputting the video signal comprises the steps of:

doubling the interpolated data Z and each scanning line data corresponding to the signal B and alternately outputting the doubled scanning line data;

controlling doubling operations of the scanning line data; and converting the alternately output scanning line data to output the video signal.

8. A scanning line interpolation method comprising the steps of:

obtaining a signal B by delaying an image input signal D by one scanning line;

obtaining a signal A by delaying the signal B by one pixel;

obtaining a signal C by delaying an input signal D by one pixel;

comparing correlation of the signals A, B, C, and D to detect signals having the strongest correlation from four pixels corresponding to the signals A, B, C, and D; and generating interpolated data Z by performing average value processing using detection results having the strongest correlation, and wherein the step of calculating the interpolated data Z comprises calculating the interpolated data by average value processing using $$Z=(aA+bB+cC+dD)/(a+b+c+d)$$

under conditions that when each of symbols a, b, c, and d representing comparison results of said level comparison means has correlation with other pixels, each symbol is set at "1"; when each symbol has no correlation with other pixels, each symbol is set at "0"; and when each symbol has no correlation with all pixels, each symbol is set at "1".

9. A method according to claim 8, wherein the interpolated data Z is located at an equal distance from the four pixels.

10. A scanning line interpolation apparatus, comprising:

a scanning line delay element connected to an image input and having a delay element output, the scanning line delay element receiving an image input signal D from the image input and outputting, at the delay element output, a signal B equal to the input signal D delayed by one scanning line;

a first pixel delay element having an input connected to the delay element output, and having a first delay output, the first pixel delay element receiving the signal B and outputting a signal A at the first delay output, the signal A equal to the signal B delayed by one pixel;

a second pixel delay element having an input connected to the image input, and having a second delay output, the second pixel delay element receiving the image input signal D from the image input and outputting a signal C at the second delay output, the signal C equal to the input signal D delayed by one pixel;

a video level comparator with input connections connected to the image input, the delay element output, the first delay output, and the second delay output, and having a comparator output, the video level comparator providing, at the comparator output, binary output values corresponding to each of signals A, B, C, and D based on a strongest correlation between signals A, B, C, and D; and an interpolated data calculator with input connections connected to the image input, the delay element output, the first delay output, the second delay output, and the comparator output, the interpolated data calculator, and generating an interpolated data Z using the signals A, B, C, D and the corresponding binary output values from the video level comparator.

* * * * *